United States Patent
Onoue

(10) Patent No.: US 8,603,649 B2
(45) Date of Patent: Dec. 10, 2013

(54) PERPENDICULAR MAGNETIC RECORDING MEDIUM

(75) Inventor: Takahiro Onoue, Singapore (SG)

(73) Assignee: WD Media (Singapore) Pte. Ltd., Singapore (SG)

( * ) Notice: Subject to any disclaimer, the term of this patent is extended or adjusted under 35 U.S.C. 154(b) by 102 days.

(21) Appl. No.: 12/666,255

(22) PCT Filed: Oct. 6, 2008

(86) PCT No.: PCT/JP2008/068177
§ 371 (c)(1),
(2), (4) Date: Dec. 22, 2009

(87) PCT Pub. No.: WO2009/048045
PCT Pub. Date: Apr. 16, 2009

(65) Prior Publication Data
US 2010/0323220 A1    Dec. 23, 2010

(30) Foreign Application Priority Data
Oct. 7, 2007   (JP) .................................. 2007-262795

(51) Int. Cl.
G11B 5/66    (2006.01)
(52) U.S. Cl.
USPC ...... 428/828.1; 428/829; 428/830; 428/836.2
(58) Field of Classification Search
None
See application file for complete search history.

(56) References Cited

U.S. PATENT DOCUMENTS

| | | | |
|---|---|---|---|
| 7,976,965 B2* | 7/2011 | Shimizu et al. | 428/828.1 |
| 2004/0253486 A1* | 12/2004 | Chen et al. | 428/694 TS |
| 2006/0204791 A1* | 9/2006 | Sakawaki et al. | 428/828.1 |
| 2006/0222900 A1 | 10/2006 | Inamura et al. | |
| 2007/0223142 A1* | 9/2007 | Takekuma et al. | 360/131 |
| 2007/0231609 A1* | 10/2007 | Ajan et al. | 428/828.1 |
| 2008/0124579 A1 | 5/2008 | Kaitsu et al. | |
| 2009/0226763 A1* | 9/2009 | Oka | 428/829 |
| 2010/0190035 A1* | 7/2010 | Sonobe et al. | 428/827 |

FOREIGN PATENT DOCUMENTS

| | | |
|---|---|---|
| JP | 2003-346315 A | 12/2003 |
| JP | 2004-310910 A | 11/2004 |
| JP | 2005-196898 A | 7/2005 |
| JP | 2006-309922 A | 11/2006 |
| JP | 2006-351055 A | 12/2006 |
| JP | 2007-257740 A | 10/2007 |

(Continued)

OTHER PUBLICATIONS

JP Office Action dated Oct. 23, 2012 from JP Patent Application No. 2008-259931, 3 pages.

(Continued)

*Primary Examiner* — Kevin Bernatz

(57) ABSTRACT

A perpendicular magnetic recording medium includes a magnetic recording layer 22 having a granular structure composed of crystal grains containing cobalt (Co) and grown in a columnar shape and a grain boundary portion comprising a non-magnetic substance and formed between the crystal grains, and a continuous layer 24 of a thin film magnetically continuous in a film plane direction. The continuous layer 24 includes a plurality of layers 24a and 24b containing cobalt, chromium (Cr), and platinum (Pt). Among the layers, the layer 24a nearer to the magnetic recording layer has a greater chromium content.

4 Claims, 3 Drawing Sheets

(56) References Cited

FOREIGN PATENT DOCUMENTS

| | | |
|---|---|---|
| JP | 2008-123603 A | 5/2008 |
| JP | 2008-135137 A | 6/2008 |
| JP | 2008-176858 A | 7/2008 |
| JP | 2008-276914 A | 11/2008 |
| JP | 2009-099247 A | 5/2009 |
| JP | 2009-110641 A | 5/2009 |

OTHER PUBLICATIONS

Written Opinion for Singapore Patent Application No. 200908509-3 dated Apr. 13, 2011, 8 pages.

Examination Report for Singapore Patent Application No. 200908509-3 dated Oct. 5, 2011, 7 pages.

* cited by examiner

PERPENDICULAR MAGNETIC RECORDING MEDIUM

CROSS REFERENCE TO RELATED APPLICATION

This application is a National Stage of International Application No. PCT/JP2008/068177, filed Oct. 6, 2008, which claims priority from Japanese Patent Application No. 2007-262795, filed Oct. 7, 2007, the contents of all of which are incorporated herein by reference in their entirety.

TECHNICAL FIELD

This invention relates to a perpendicular magnetic recording medium to be mounted to an HDD (hard disk drive) using a perpendicular magnetic recording system.

BACKGROUND ART

With the recent increase in information processing capacity, various types of information recording technologies have been developed. In particular, the surface recording density of an HDD using a magnetic recording technology has been continuously increasing at an annual rate of about 100%. Recently, 2.5-inch-diameter magnetic disks used in HDDs and the like are required to have an information recording capacity higher than 160 GB per disk. In order to meet such a demand, it is necessary to achieve an information recoding density higher than 250 GBits per square inch.

In order to achieve a high recording density in a magnetic disk used in an HDD or the like, a magnetic disk using a perpendicular magnetic recording system (perpendicular magnetic recording disk) is recently proposed. In a conventional in-plane magnetic recording system, an axis of easy magnetization in a magnetic recording layer is oriented along a plane of a substrate surface. In the perpendicular magnetic recording system, it is arranged that the axis of easy magnetization is oriented to be perpendicular to the substrate surface. As compared with the in-plane magnetic recording system, the perpendicular magnetic recording system is capable of more effectively suppressing a thermal fluctuation phenomenon during high-density recording. Therefore, the perpendicular magnetic recording system is suitable for an increase in recording density.

Heretofore, CoCrPt—$SiO_2$ or CoCrPa—$TiO_2$ is widely used as the magnetic recording layer. In such layer, Co crystals of an hcp (hexagonal closest packed crystal lattice) structure grow in a columnar shape and Cr and $SiO_2$ (or $TiO_2$) segregate to form a nonmagnetic grain boundary. By the use of such a granular structure, fine magnetic grains physically independent from one another are easily formed so that a high recording density is easily achieved.

In the above-mentioned perpendicular magnetic recording system, a single pole perpendicular head is used to generate a magnetic field perpendicular to the magnetic recording layer. However, if the single pole perpendicular head is merely used, magnetic flux from a single pole end directly returns to a return pole on an opposite side so that a magnetic field of a sufficient intensity can not be applied to the magnetic recording layer. In view of the above, the perpendicular magnetic recording disk is provided with a soft magnetic layer under the magnetic recording layer and a path of the magnetic flux (magnetic path) is formed in the soft magnetic layer. With this structure, it is possible to apply an intense perpendicular magnetic field to the magnetic recording layer. Specifically, the soft magnetic layer is a layer in which a magnetization direction is aligned in response to a magnetic field during writing and a magnetic path is dynamically formed.

However, an intense magnetic field applied to the magnetic recording layer results in an increase in leakage magnetic field to an adjacent track. This results in a problem of WATE (Wide Area Track Erasure), i.e., a phenomenon of erasure of recorded information over an area within several micrometers from a track to be subjected to writing. As a technique for reducing WATE, it is important that a reverse magnetic domain nucleation field Hn of the magnetic recording layer has a negative value and its absolute value is large. In order to obtain high Hn (having a large absolute value), proposal is made of a CGC (Coupled Granular Continuous) medium comprising a magnetic recording layer having a granular structure and a thin film (continuous layer) which is formed above or below the magnetic recording layer and which exhibits high perpendicular magnetic anisotropy (Patent Document 1).

If a coercive force Hc of the magnetic recording layer is increased, an increase in recording density can be achieved but writing by the magnetic head tends to become difficult. In view of the above, the continuous layer also serves to improve writabiliy, i.e., overwrite characteristic by improving saturation magnetization Ms.

In other words, the purpose of forming the continuous layer on the magnetic recording layer is to reduce noise by improving the reverse magnetic domain nucleating field Hn and to improve the overwrite characteristic by improving the saturation magnetization Ms. The continuous layer may be called an auxiliary magnetic layer or a cap layer. In this application, the term "continuous layer" is used unless specifically indicated otherwise.

Patent Document 1: JP-A-2003-346315

DISCLOSURE OF THE INVENTION

Problem to be Solved by the Invention

In order to increase a recording density of a recording medium, it is a primary problem to improve the coercive force Hc. In order to achieve this, it is necessary to improve crystal orientation of magnetic grains and to achieve isolation, uniformity, and miniaturization of the magnetic grains. However, limitation is imposed upon improvement of the coercive force Hc only by improvement of the magnetic layer.

On the other hand, the present inventor already found out that the coercive force Hc is increased also by increasing the content of chromium in the continuous layer. In this event, however, the saturation magnetization Ms is decreased and, therefore, the original purpose of the continuous layer may not be achieved.

In view of the above-mentioned problem caused in the perpendicular magnetic recording medium, this invention has been made. It is an object of this invention to provide, by improving a structure and a composition of a continuous layer on a magnetic layer, a perpendicular magnetic recording medium which is improved in coercive force Hc to increase a recording density of the recording medium without losing original functions of the continuous layer, i.e., noise reduction and maintenance of overwrite characteristic.

Means to Solve the Problem

In order to resolve the above-mentioned problem, according to a representative structure of this invention, in a perpendicular magnetic recording medium comprising a magnetic recording layer having a granular structure composed of crystal grains containing cobalt (Co) and grown in a columnar shape and a grain boundary portion comprising a nonmagnetic substance and formed between the crystal grains, and a continuous layer formed adjacently on the magnetic recording layer and comprising a thin film magnetically continuous in a film plane direction, the continuous layer contains cobalt, chromium (Cr), and platinum (Pt), and the continuous layer has a chromium content increased towards the magnetic recording layer.

In the continuous layer formed adjacently on the magnetic recording layer, a lower part nearer to the magnetic recording layer has a greater content of chromium so as to effectively improve the coercive force Hc while an upper part has a smaller content of chromium to achieve noise reduction and maintenance of overwrite characteristic.

The above-mentioned continuous layer may comprise two layers including a lower layer and an upper layer. The lower layer may have a chromium content of 18 to 20 at %. The upper layer may have a chromium content of 15 to 18 at %.

If a layer has a higher content of chromium, the coercive force Hc can remarkably be increased as the thickness of the layer is increased. Such increase in coercive force Hc is assured by the lower layer formed adjacently on the magnetic recording layer.

The above-mentioned nonmagnetic substance may be one or more materials selected from a group consisting of chromium oxide, chromium, titanium oxide, silicon oxide, zirconium oxide, and tantalum oxide. Presumably, chromium of the continuous layer inherits the nature of the above-mentioned nonmagnetic substance and has a nature of segregating around a magnetic substance (Co). It is conceivable that chromium promotes columnar epitaxial growth of Co.

The above-mentioned lower layer may have a thickness greater than 0 and substantially not greater than 3 nm, and the upper layer may have a thickness substantially between 3 and 7 nm. If the thickness of the lower layer is excessively large, an S/N ratio is decreased. If the thickness of the upper layer falls within the above-mentioned range, the coercive force Hc practically usable is obtained.

Further, the above-mentioned continuous layer may have a composition of cobalt-chromium-platinum-boron (CoCrPtB) containing boron (B). Boron has an effect of reducing noise. With this structure, less noise is generated as compared with the case where the continuous layer has the above-mentioned thickness without containing boron.

The content of boron may be preferably 5 at % or less. If the content of boron is greater, a sufficient reverse magnetic domain nucleating field (Hn) can not be obtained.

Effect of the Invention

According to this invention, it is possible to provide, by improving a structure and a composition of a continuous layer, a perpendicular magnetic recording medium which is improved in coercive force Hc to increase a recording density of the recording medium without losing original functions of the continuous layer, i.e., noise reduction and maintenance of overwrite characteristic.

DESCRIPTION OF REFERENCE NUMERALS

Figure 1:
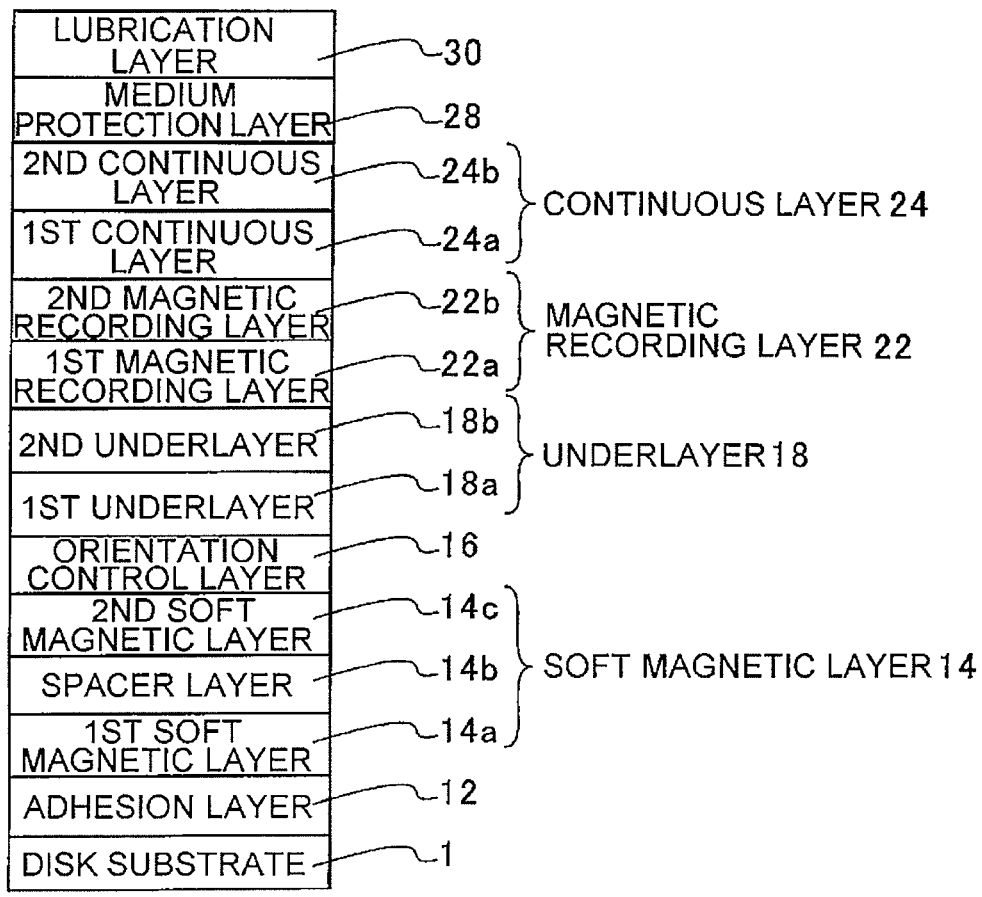
FIG. 1 is a view for describing a magnetic recording medium according to an exemplary embodiment of this invention.

1 . . . disk substrate
12 . . . adhesion layer
14 . . . soft magnetic layer
14a . . . first soft magnetic layer
14b . . . spacer layer
14c . . . second soft magnetic layer
16 . . . orientation control layer
18 . . . underlayer
18a . . . first underlayer
18b . . . second underlayer
22 . . . magnetic recording layer
22a . . . first magnetic recording layer
22b . . . second magnetic recording layer
24 . . . continuous layer
24a . . . first continuous layer
24b . . . second continuous layer
28 . . . medium protection layer
30 . . . lubrication layer

BEST MODE FOR EMBODYING THE INVENTION

Referring now to the accompanied drawings, an exemplary embodiment of a perpendicular magnetic recording medium according to this invention will be described in detail. In the figures, those elements which do not directly relate to this invention are not illustrated. Similar elements are designated by the same reference numerals. It is noted here that sizes, materials, and other specific numerical values shown in the following exemplary embodiment are no more than examples provided in order to facilitate understanding of the invention and do not limit the present invention unless specifically indicated otherwise.

FIG. 1 is a view for describing a structure of a perpendicular magnetic recording medium according to the exemplary embodiment of this invention. The perpendicular magnetic recording medium illustrated in FIG. 1 comprises a disk substrate 1, an adhesion layer 12, a first soft magnetic layer 14a, a spacer layer 14b, a second soft magnetic layer 14c, an orientation control layer 16, a first underlayer 18a, a second underlayer 18b, a first magnetic recording layer 22a, a second magnetic recording layer 22b, a continuous layer 24, a medium protection layer 28, and a lubrication layer 30. A combination of the first soft magnetic layer 14a, the spacer layer 14b, and the second soft magnetic layer 14c forms a soft magnetic layer 14. A combination of the first underlayer 18a and the second underlayer 18b forms an underlayer 18. A combination of the first magnetic recording layer 22a and the second magnetic recording layer 22b forms a magnetic recording layer 22.

First, amorphous aluminosilicate glass was formed into a disk-like shape by direct press to produce a glass disk. The glass disk was successively subjected to grinding, polishing, and chemical strengthening to obtain the smooth nonmagnetic disk substrate 1 comprising a chemically strengthened glass disk.

On the disk substrate 1 thus obtained, those layers from the adhesion layer 12 to the continuous layer 24 were successively formed by DC magnetron sputtering in an Ar atmosphere using a vacuumed film-forming apparatus. The medium protection layer 28 was formed by CVD. Thereafter, the lubrication layer 30 was formed by dip coating. In view of high productivity, it is also preferable to use in-line type deposition.

The exemplary embodiment is characterized by a structure of the continuous layer 24, which will later be described. At first, structures and manufacturing methods of the respective layers will be described.

The adhesion layer 12 was formed using a Ti-alloy target so as to be a Ti-alloy layer of 10 nm. By forming the adhesion layer 12, the adhesion between the disk substrate 1 and the soft magnetic layer 14 can be enhanced and, therefore, it is possible to prevent the soft magnetic layer 14 from peeling. As a material of the adhesion layer 12, for example, a CrTi alloy may be used.

The soft magnetic layer 14 was configured to have AFC (antiferromagnetic exchange coupling) by interposing the nonmagnetic spacer layer 14b between the first soft magnetic layer 14a and the second soft magnetic layer 14c. With this structure, the soft magnetic layer 14 has a magnetization direction which is aligned along a magnetic path (magnetic circuit) with high accuracy and a vertical component in the magnetization direction is significantly decreased. Therefore, it is possible to reduce noise generated from the soft magnetic layer 14. Specifically, each of the first soft magnetic layer 14a and the second soft magnetic layer 14c has a composition of CoFeTaZr. The spacer layer 14b has a composition of Ru (ruthenium).

The orientation control layer 16 has an effect of protecting the soft magnetic layer 14 and an effect of promoting alignment of orientation of crystal grains of the underlayer 18. The orientation control layer may be made of a material selected from Ni, Cu, Pt, Pd, Zr, Hf, and Nb. Furthermore, the orientation control layer may be made of an alloy containing the above-mentioned metal as a main component and one or more additional elements selected from Ti, V, Ta, Cr, Mo, and W. For example, NiW, CuW, or CuCr may be preferably selected.

The underlayer 18 has an hcp structure and serves to grow hcp-structure crystals of the magnetic recording layer 22 as a granular structure. Therefore, as the underlayer 18 has higher crystal orientation, orientation of the magnetic recording layer 22 can be improved more. A material of the underlayer may be selected from Ru, RuCr, and RuCo. Ru has a hcp structure and can achieve excellent orientation of the magnetic recording layer containing Co as a main component.

The underlayer 18 has a two-layer structure made of Ru. The second underlayer 18b as an upper layer is formed under an Ar gas pressure higher than that when the first underlayer 18a as a lower layer is formed. When the gas pressure is high, a mean free path of sputtered particles is shortened. Therefore, a deposition rate is decreased so that crystal orientation is improved. In addition, a high pressure causes the size of a crystal lattice to be reduced. The size of the crystal lattice of Ru is greater than that of the crystal lattice of Co. Therefore, if the size of the crystal lattice of Ru is reduced, the size approaches to that of Co so as to further improve crystal orientation of a granular layer of Co.

The magnetic recording layer 22 comprises the first magnetic recording layer 22a having a thin thickness and the second magnetic recording layer 22b having a heavy thickness.

The first magnetic recording layer 22a was formed to have a 2 nm CoCrPt—$Cr_2O_3$ hcp crystal structure by using a hard magnetic target made of CoCrPt containing chromium oxide ($Cr_2O_3$) as an example of a nonmagnetic substance. The nonmagnetic substance segregated around a magnetic substance to form a grain boundary. The magnetic grains formed a granular structure comprising crystal grains grown in a columnar shape and a grain boundary portion of the nonmagnetic substance formed between the crystal grains. The magnetic grains epitaxially grew continuously from the granular structure of the underlayer.

The second magnetic recording layer 22b was formed to have a 10 nm CoCrPt—$TiO_2$ hcp crystal structure by using a hard magnetic target made of CoCrPt containing titanium oxide ($TiO_2$) as an example of the nonmagnetic substance. In the second magnetic recording layer 22b also, the magnetic grains formed a granular structure.

In this exemplary embodiment, the first magnetic recording layer 22a and the second magnetic recording layer 22b are formed by using different materials (targets). Without being limited thereto, the materials of these layers may be same in composition or kind. As the nonmagnetic substance for forming a nonmagnetic domain, for example, silicon oxide ($SiO_x$), chromium (Cr), chromium oxide ($CrO_x$), titanium oxide ($TiO_2$), zirconium oxide ($ZrO_2$), or tantalum oxide ($Ta_2O_5$) may be used.

As the continuous layer 24 as a characteristic of this exemplary embodiment, a thin film (continuous layer) exhibiting high perpendicular magnetic anisotropy and magnetically continuous in a film plane direction is formed on the granular magnetic layer to form a CGC (coupled granular continuous) structure. With this structure, high thermal resistance of the continuous film is obtained in addition to a high-density recording characteristic and a low-noise characteristic of the granular layer.

The continuous layer 24 has a composition of CoCrPtB and comprises a first continuous layer 24a as a lower layer and a second continuous layer 24b as an upper layer. Boron (B) is contained because boron has a noise reducing effect.

The medium protection layer 28 was formed by depositing carbon by CVD while maintaining vacuum and contains diamond-like carbon. The medium protection layer 28 is a protection layer for protecting the perpendicular magnetic recording layer from impact of a magnetic head. Generally, carbon deposited by CVD is improved in film hardness as compared with carbon deposited by sputtering and is therefore capable of more effectively protecting the perpendicular magnetic recording layer from the impact of the magnetic head. If a bias voltage is increased in CVD, the film hardness can be improved.

The lubrication layer 30 was formed by depositing PFPE (perfluoropolyether) by dip coating. The lubrication layer 30 has a thickness of about 1 nm.

Figure 2:
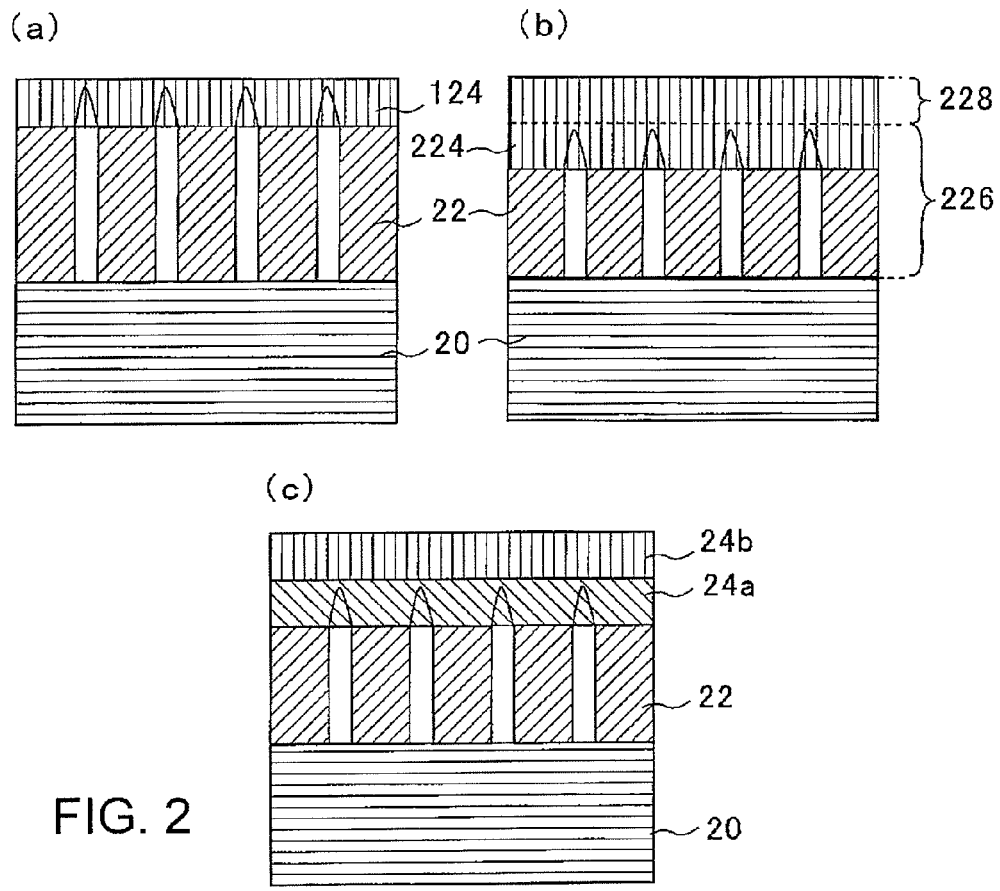
FIG. 2 shows (c) a view for describing a structure of a continuous layer in the exemplary embodiment in FIG. 1 and (a) and (b) views for describing structures of continuous layers to be compared with the exemplary embodiment.
Figure 3:
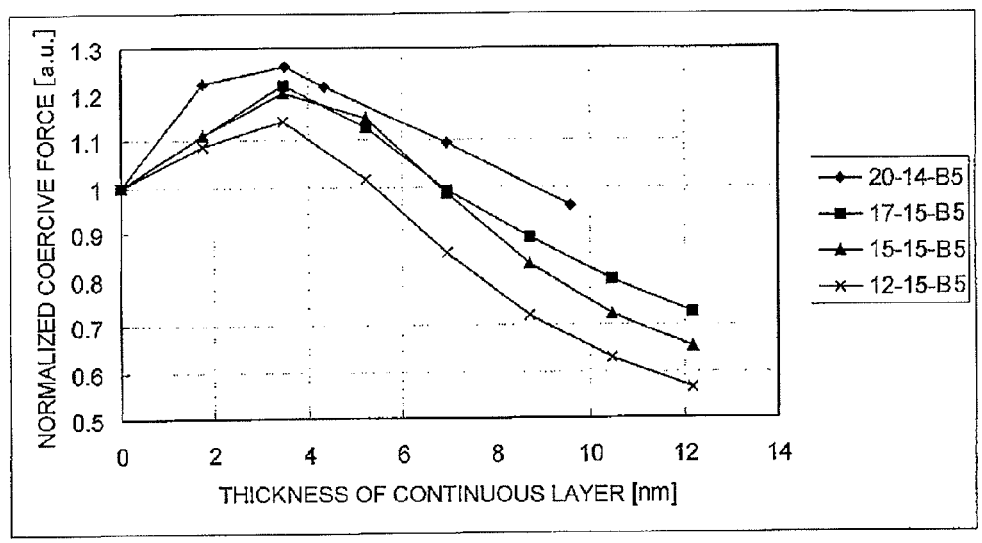
FIG. 3 is a graph showing a relationship between a thickness of a continuous layer of a single-layer structure having a single monolithic composition and a coercive force.

The continuous layer in the perpendicular magnetic recording medium of the above-mentioned structure will be described further in detail. FIG. 2 shows views for describing the structure of the continuous layer, (c) being a view for describing the structure of the continuous layer in this exemplary embodiment in FIG. 1, (a) and (b) being views for describing structures of continuous layers to be compared with this exemplary embodiment. FIG. 3 is a graph showing the relationship between the thickness of a continuous layer of a single-layer structure having a single monolithic composition and a coercive force.

At first referring to FIG. 3, when the thickness of the continuous layer is gradually increased starting from the case when no continuous film is formed (the thickness is 0 nm), the coercive force Hc is increased and then decreased. The present inventor diligently studied the above-mentioned phenomenon and observed the following. In a lower part of the continuous layer that is formed adjacently on the magnetic recording layer (i.e., a part nearer to the magnetic layer), Co epitaxially grows in a columnar shape inheriting the granular structure of the magnetic layer and Cr assumed to have a nature of segregating around the magnetic substance (Co), like the nonmagnetic substance contained in the magnetic layer, actually segregates at a grain boundary to promote the epitaxial growth. Towards an upper part of the continuous layer, crystal growth along a film plane becomes predominant to shift into the original nature of the continuous layer.

In the comparative examples in (a) and (b) in FIG. 2, each of continuous layers 124 and 224 is a single layer having a single monolithic composition with a constant content ratio of CoCrPtB. Herein, the continuous layer 124 in FIG. 2 (a) has a thin thickness thinner than 4 nm. On the other hand, the continuous layer in FIG. 2 (b) has a heavy thickness within a range between 4 nm and 12 nm. In case of the continuous layer having the monolithic composition, if the thickness is thicker, the coercive force Hc is increased and then decreased as already described. This is presumably because a part 226 including the magnetic recording layer 22 and a lower part of the continuous layer 224 that is formed adjacently on the magnetic recording layer 22 and that inherits the nature of the magnetic recording layer 22 serves as a granular structure.

FIG. 2 (c) is a view for describing the structure of the continuous layer according to the exemplary embodiment in FIG. 1. The continuous layer 24 comprises two layers, i.e., the first continuous layer 24a and the second continuous layer 24b which are different in composition from each other. The above-mentioned structure is adopted so that the content of chromium in the first continuous layer 24a is increased to increase the coercive force Hc and the content of chromium in the second continuous layer 24b is decreased to improve the overwrite characteristic and the S/N ratio.

The chromium content in the first continuous layer 24a is 18 to 20 at % while the chromium content in the second continuous layer 24b is 15 to 18 at %. As shown in FIG. 3, if a layer has a higher chromium content, the coercive force Hc can remarkably be increased as the thickness of the layer is increased. Such increase in coercive force Hc is assured by the first continuous layer 24a.

For example, a curve 20-14-B5 represents the chromium content of 20 at %, the platinum content of 14 at %, and the boron content of 5 at %. As shown in FIG. 3, in a layer having a higher chromium content, the coercive force Hc is remarkably increased as the thickness is increased as described above.

In FIG. 3, an arbitrary unit (a.u.) is given where the coercive force Hc when "no continuous layer is formed" is defined as 1, so as to indicate how the coercive force Hc is increased by providing the continuous layer 24. Specifically, the coercive force Hc is increased as follows. When Cr>15 at %, it has been confirmed that the coercive force Hc is improved by about 20% or more. When the content of Cr is 12 at %, the coercive force Hc is increased only by about 10% and, therefore, the continuous layer does not sufficiently act as a layer intended to increase the coercive force Hc. Accordingly, the lower limit of Cr is 15 at %.

As a result of the present inventor's study, a sufficient coercive force can not be obtained with the composition of 21-15-B5. Because a sufficient effect of improving characteristics is not expected merely by adopting the two-layer structure, the upper limit of Cr need not specifically be considered. Preferably, the content of Cr in the continuous layer 24 falls within a range between 15 at % and 20 at %.

The Cr content of the second continuous layer 24b may be considered as follows. The second continuous layer 24b is originally intended to improve the overwrite characteristic. Therefore, the second continuous layer 24b must have high saturation magnetization Ms as compared with the first continuous layer 24a. Accordingly, the chromium content of the second continuous layer 24b is smaller than 20 at % and is smaller than the chromium content of the first continuous layer 24a.

In this exemplary embodiment, the continuous layer 24 comprises the two layers. However, as long as the chromium content is greater in a layer nearer to the magnetic recording layer, the number of layers forming the continuous layer 24 is not limited to two but may be any desired number. Furthermore, the continuous layer 24 need not obviously be separated into a plurality of layers but is required to have a chromium content increased towards the magnetic recording layer. It is desired that, as shown in (b) and (c) in FIG. 2, the lower part of the continuous layer 24 that is formed adjacently on the magnetic recording layer 22 has a higher chromium content to effectively improve the coercive force Hc while the upper part has a smaller chromium content to achieve noise reduction and maintenance of the overwrite characteristic.

Figure 4:
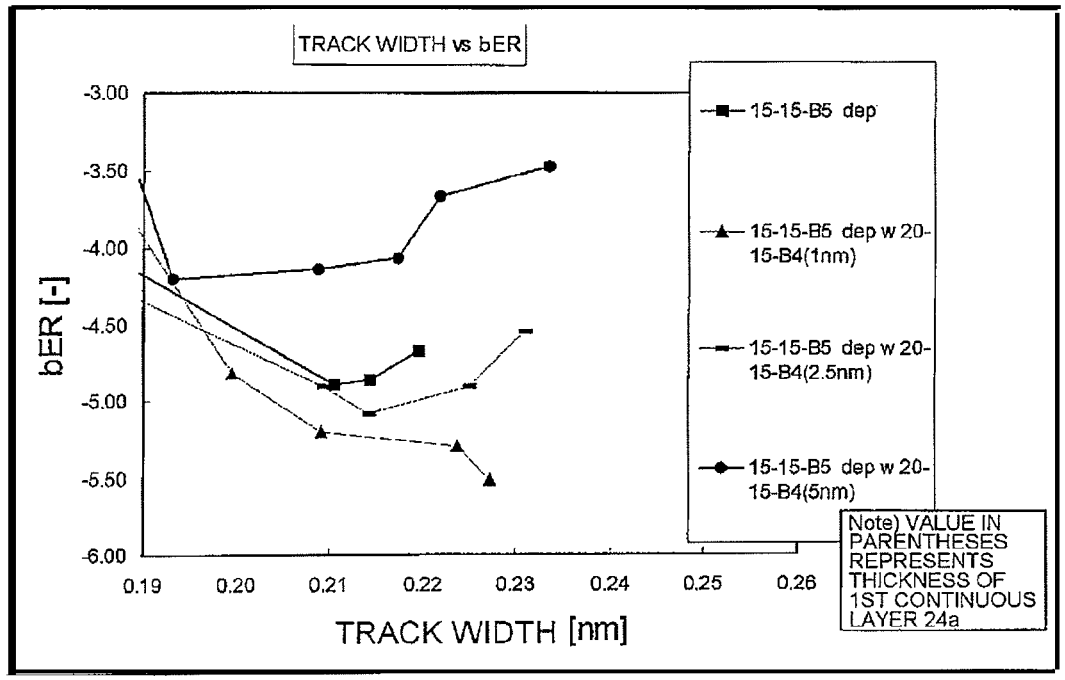
FIG. 4 is a graph showing a relationship of a recording track width of a magnetic recording medium and a bit error rate in case where a continuous layer comprises two layers different in composition from each other and when the second continuous layer has a fixed thickness while the thickness of the first continuous layer is variously changed.

FIG. 4 is a graph showing the relationship between a recording track width of the magnetic recording medium and a bit error rate in case where the continuous layer 24 comprises two layers different in composition from each other and when the thickness of the second continuous layer 24b is fixed while the thickness of the first continuous layer 24a is variously changed.

In FIG. 4, CoCrPt—$TiO_2$ has a composition of 20-15-B4 in the first continuous layer 24a having a greater chromium content and a composition of 15-15-B5 in the second continuous layer 24b having a smaller chromium content.

FIG. 4 plots the relationship between the recording track width and the bit error rate when the thickness of the second continuous layer 24b is fixed and the thickness of the first continuous layer 24a is 0 nm, 1 nm, 2.5 nm, and 5 nm.

The bit error rate as a horizontal axis in FIG. 4 is a value linked to the S/N ratio. A smaller bit error rate (more minus) is desirable because noise is reduced more. Referring to FIG. 4, noise is further reduced when the first continuous layer 24a has a thickness of 1 nm and a thickness of 2.5 nm as compared with the case where the first continuous layer 24a is not formed (has a thickness of 0 mm).

However, if the first continuous layer 24a is thickened to 5 nm, noise is increased on the contrary. Accordingly, the first continuous layer 24a preferably has a thickness greater than 0 and substantially not greater than 3 nm.

Figure 5:
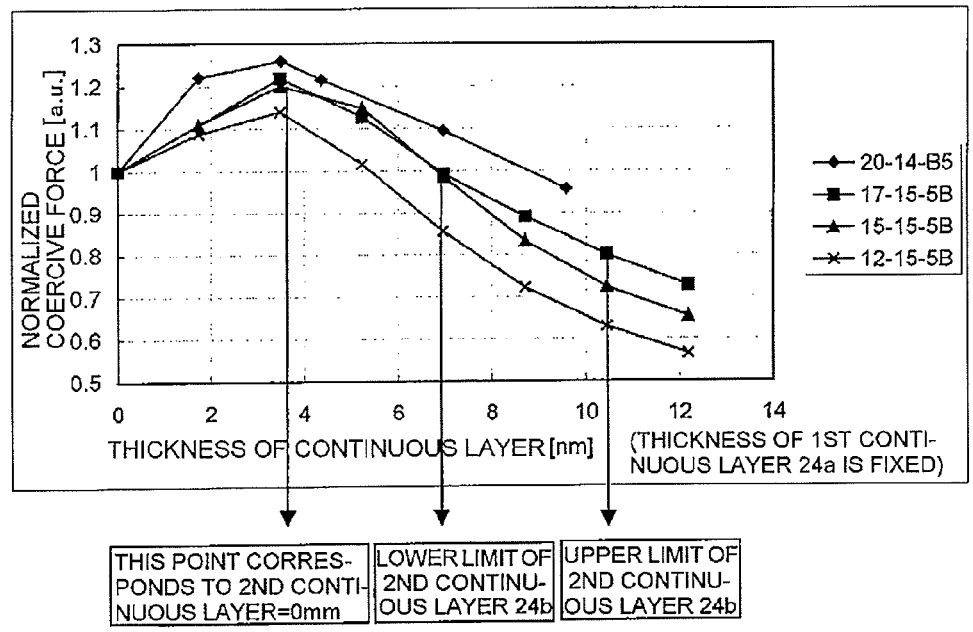
FIG. 5 is a graph, similar to FIG. 3, for use in determining the thickness of the second continuous layer.

FIG. 5 is a graph, similar to FIG. 3, for determining the thickness of the second continuous layer 24b. It is assumed here that the coercive force Hc (1 on the horizontal axis in FIG. 5) of the magnetic recording layer 22 without the continuous layer 24 is 5000 oersted (Oe). According to FIG. 5, the maximum coercive force obtained by providing the desired first continuous layer 24a is 6000 oersted. The coercive force must be decreased to the range of 4000 to 5000 oersted which is practically useable. Specifically, the normalized coercive force in the graph of FIG. 5 must be decreased to about 0.8 to 1. From the tendency shown in the graph of FIG. 5, the thickness of the second continuous layer 24b preferably falls within the range of substantially 3 to 7 mm such that the coercive force Hc is 4000 to 5000 oersted (the normalized coercive force is about 0.8 to 1).

Although the preferred exemplary embodiment of this invention has been described above with reference to the accompanied drawings, it is needless to say that this invention is not limited to the above-described embodiment. It is obvious that those skilled in the art can envisage various alterations and modifications within the scope described in the claims, and it will be understood that those alterations and modifications belong to the technical scope of this invention.

Industrial Applicability

This invention is applicable to a perpendicular magnetic recording medium to be mounted to an HDD (hard disk drive) or the like using a perpendicular magnetic recording system.

The invention claimed is:

1. A perpendicular magnetic recording medium comprising a magnetic recording layer having a granular structure composed of crystal grains containing cobalt (Co) and grown in a columnar shape and a grain boundary portion comprising a nonmagnetic substance and formed between the crystal grains, and a continuous layer formed adjacently on the magnetic recording layer and comprising a thin film magnetically continuous in a film plane direction, wherein:

the continuous layer contains cobalt, chromium (Cr), and platinum (Pt);

the continuous layer has a chromium content increased towards the magnetic recording layer; and the continuous layer comprises two layers including a lower layer and an upper layer, the lower layer having a chromium content of 18 to 20 at %, the upper layer having a chromium content of 15 to 18 at %, the upper layer having a lower chromium content than the lower layer, the upper layer having a higher saturation magnetization than the lower layer, and the lower layer having a thickness greater than 0 and not greater than 3 nm.

2. The perpendicular magnetic recording medium according to claim 1, wherein the nonmagnetic substance is one or more materials selected from a group consisting of chromium oxide, chromium, titanium oxide, silicon oxide, zirconium oxide, and tantalum oxide.

3. The perpendicular magnetic recording medium according to claim 1, wherein the upper layer has a thickness between 3 and 7 nm.

4. The perpendicular magnetic recording medium according to claim 1, wherein the continuous layer further has a composition of cobalt-chromium-platinum-boron (CoCrPtB) containing boron (B).

* * * * *